United States Patent
Huang

(10) Patent No.: US 7,472,890 B2
(45) Date of Patent: Jan. 6, 2009

(54) FASTENER FOR STRAP

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 81 days.

(21) Appl. No.: 11/566,794

(22) Filed: Dec. 5, 2006

(65) Prior Publication Data

US 2008/0128541 A1  Jun. 5, 2008

(51) Int. Cl.
*B21F 9/00* (2006.01)

(52) U.S. Cl. .................. 254/223; 24/70 ST; 24/69 ST; 410/100; 410/103

(58) Field of Classification Search ................ 254/222, 254/223; 24/70 ST, 69 ST, 71 ST; 410/100, 410/103
See application file for complete search history.

(56) References Cited

U.S. PATENT DOCUMENTS

| | | | | |
|---|---|---|---|---|
| 4,860,606 A | * | 8/1989 | Rousseau | 74/157 |
| 5,494,387 A | * | 2/1996 | Ruegg | 410/103 |
| 6,135,685 A | * | 10/2000 | Anthony et al. | 410/100 |
| 6,799,751 B1 | * | 10/2004 | Anderson | 254/223 |
| 7,069,623 B2 | * | 7/2006 | Lu | 24/68 CD |
| 2007/0264098 A1 | * | 11/2007 | Chou | 410/103 |

OTHER PUBLICATIONS

Taiwanese Patent No. M288282, Mar. 1, 2006, 12 pages.

* cited by examiner

*Primary Examiner*—Emmanuel M Marcelo
(74) *Attorney, Agent, or Firm*—Alan Kamrath; Kamrath & Associates PA

(57) ABSTRACT

A fastener includes a frame, a collar connected to the frame and a reel inserted through the collar and the frame. A strap can be reeled in and reeled out when the reel is rotated in a direction and an opposite direction. A first switching device is provided between the reel and the collar so that the first switching device is operable to switch the reel between a reel-out mode and a reel-in mode. A second switching device is provided between the reel and the frame so that the second switching device is operable to switch the reel between a reel-in mode and a reel-out mode.

20 Claims, 11 Drawing Sheets

FASTENER FOR STRAP

BACKGROUND OF INVENTION

1. Field of Invention

The present invention relates to a fastener for a strap.

2. Related Prior Art

Disclosed in Taiwanese Patent M288282 is a conventional fastener for a strap 7. The fastener includes a frame 1, a reel 4, a ratchet wheel 2, a driver 3, a first detent 33 and a second detent 5. The frame 1 includes a first wall 11a and a second wall 11b. Each of the walls defines an opening 12. The reel 4 is rotationally inserted in the openings 12. The reel 4 defines a slot 41 through which the strap 7 can be inserted. The ratchet wheel 2 is secured to the reel 4. The reel 4 includes a ring 42 at an end and an aperture 43 at another end. The driver 3 includes a hub 30 secured to the ring 42 and a handle 32 extended from the hub 30. The first detent 33 is pivotally connected to the handle 32. The first detent 33 can be engaged with the ratchet wheel 2 to allow the driver 3 to drive the ratchet wheel 2 and therefore the reel 4 in a one-way manner, i.e., reel in the strap 7. The second detent 5 is pivotally connected to the first wall 11a. The second detent 5 can be engaged with the ratchet wheel 2 to allow one-way rotation of the ratchet wheel 2 and, therefore, the reel 4. This conventional fastener is useful in stressing the strap 7. However, this conventional fastener fails to provide any provisions for slowing down the slacking of the strap 7, and there is potential danger related to a fast moving strap 7 that could hurt a person like a whip could.

The present invention is therefore intended to obviate or at least alleviate the problems encountered in the prior art.

SUMMARY OF INVENTION

According to the present invention, a fastener includes a frame, a collar connected to the frame and a reel inserted through the collar and the frame. A strap can be reeled in and reeled out when the reel is rotated in a direction and an opposite direction. A first switching device is provided between the reel and the collar so that the first switching device is operable to switch the reel between a reel-out mode and a reel-in mode. A second switching device is provided between the reel and the frame so that the second switching device is operable to switch the reel between a reel-in mode and a reel-out mode.

An advantage of the fastener according to the present invention is that the switch between the reel-in and reel-out modes is convenient.

Another advantage of the fastener according to the present invention is safe operation since the reeling out of the strap is slow.

Other advantages and features of the present invention will be apparent from the following description referring to the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
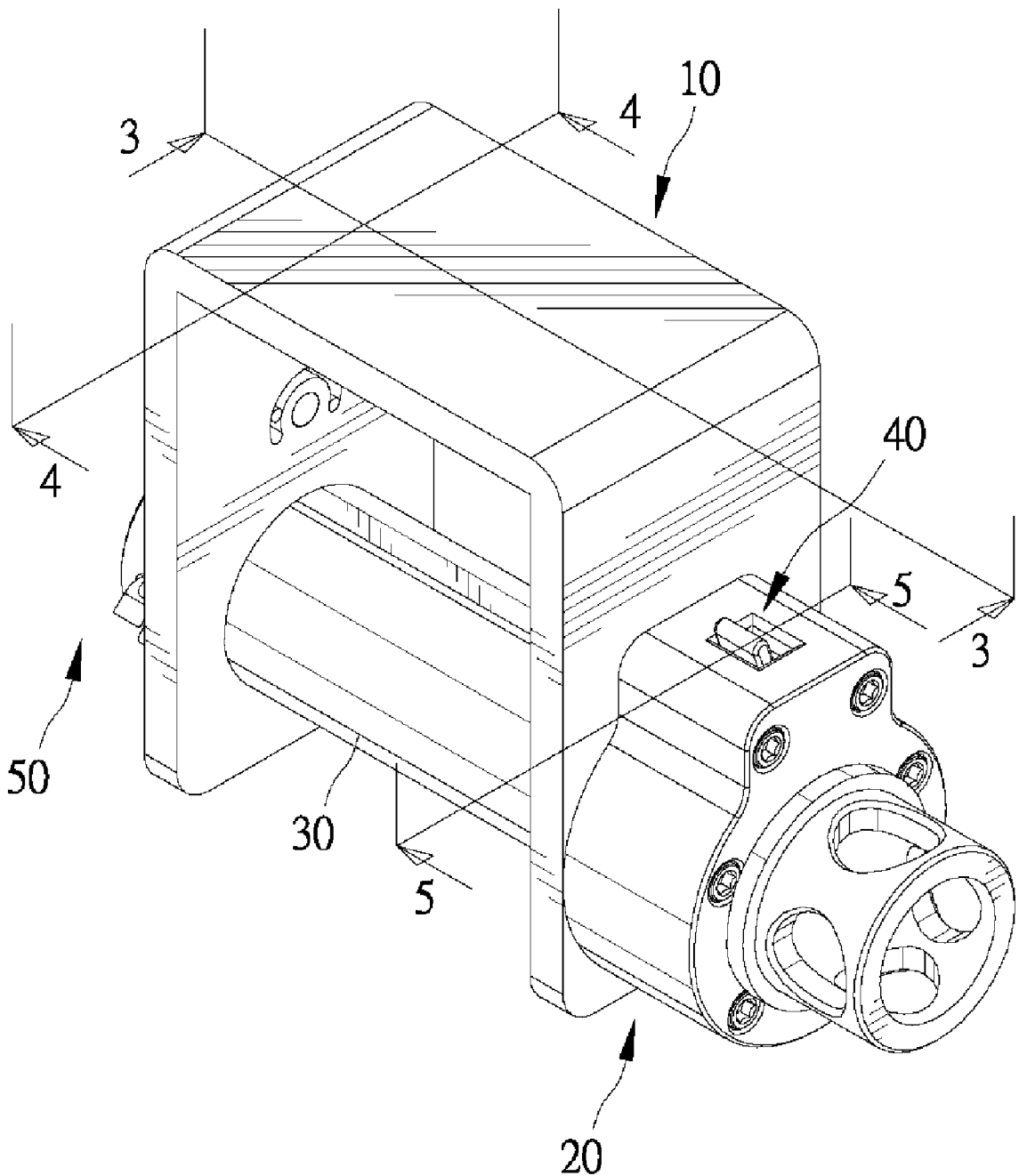
FIG. 1 is a perspective view of a fastener for a strap according to the preferred embodiment of the present invention.

Referring to the drawings, there is shown a fastener for a strap 60 according to the preferred embodiment of the present invention.

Figure 2:
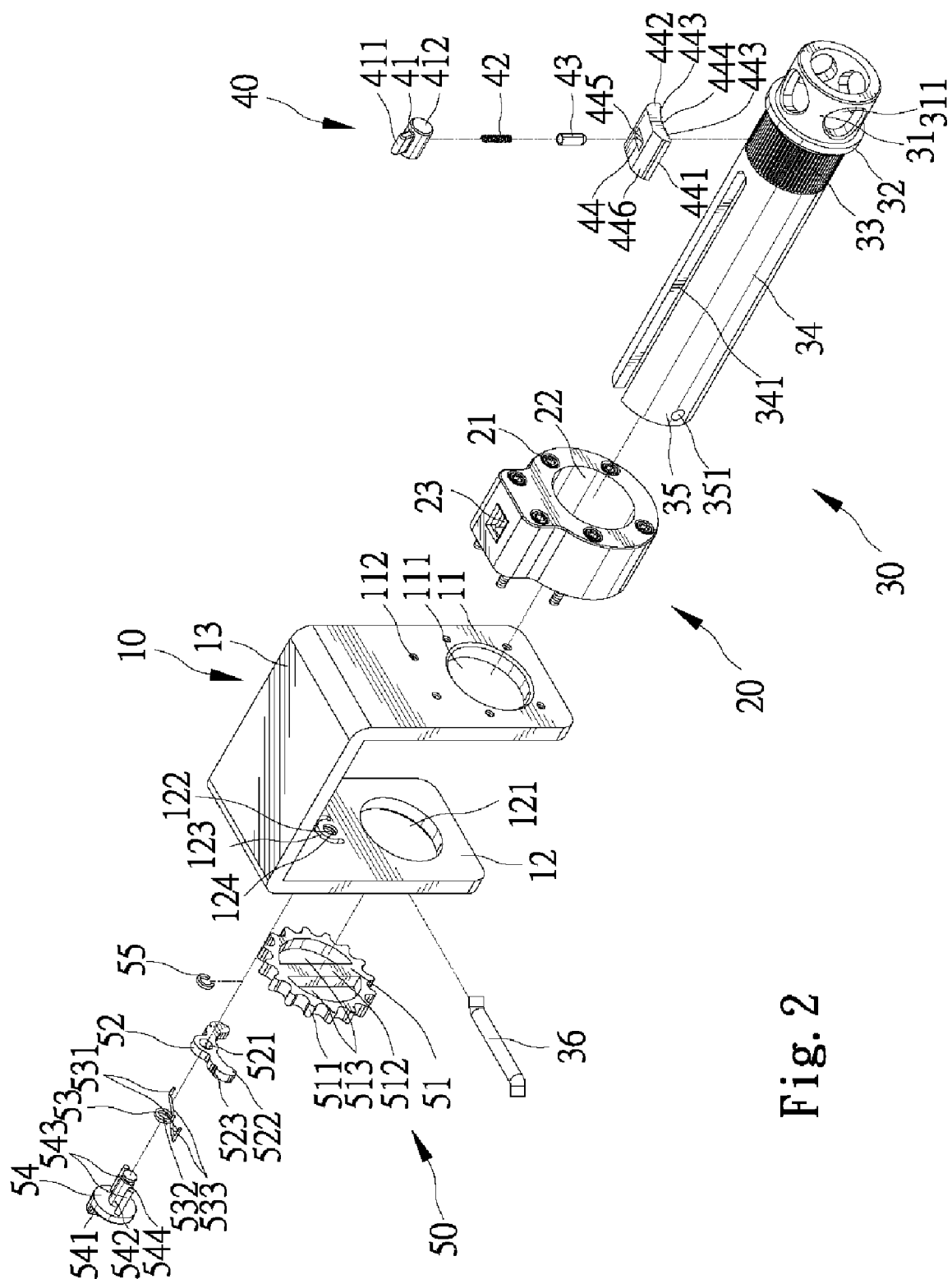
FIG. 2 is an exploded view of the fastener shown in FIG. 1.
Figure 3:
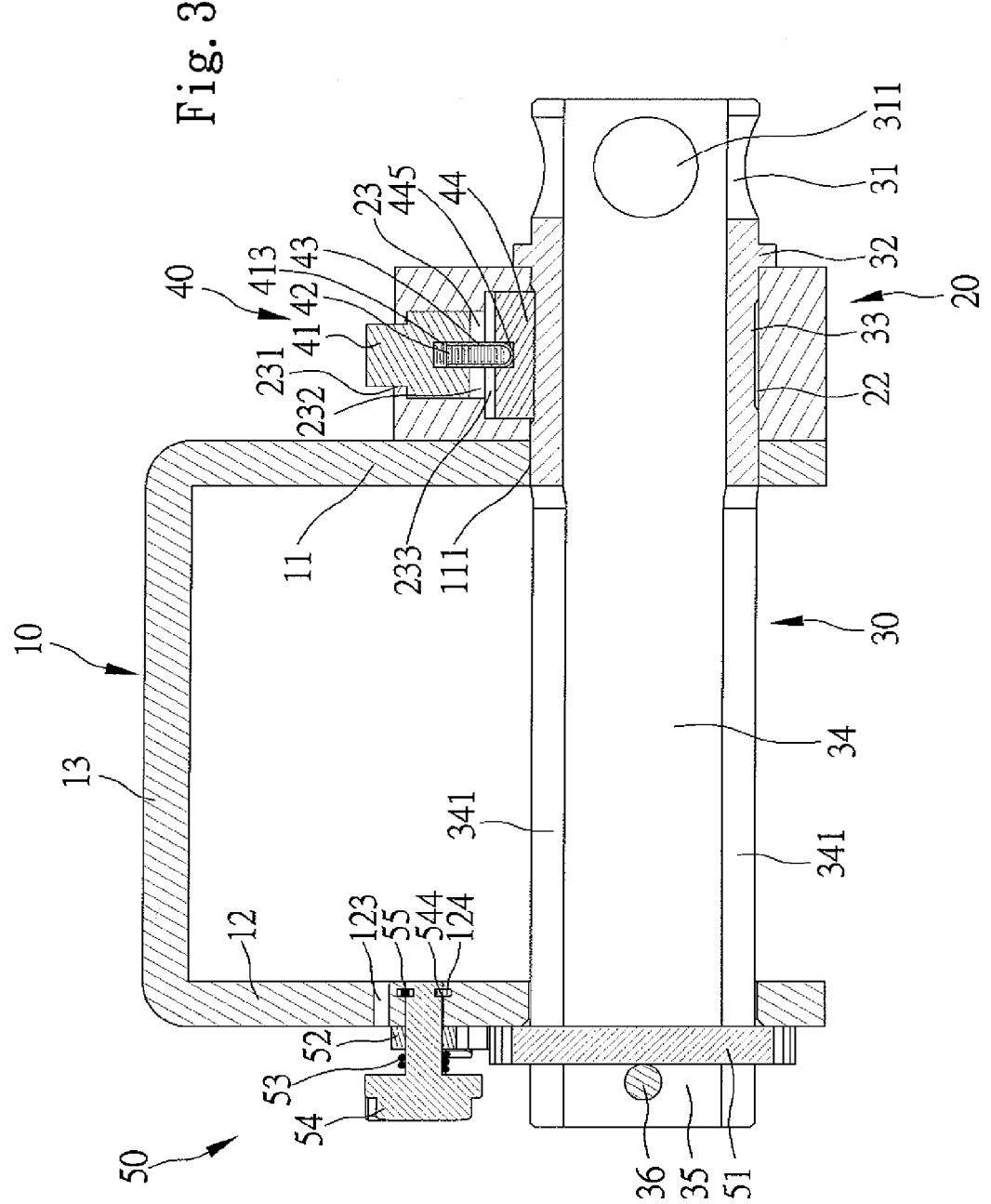
FIG. 3 is a cross-sectional view of the fastener taken along a line 3-3 shown in FIG. 1.
Figure 4:
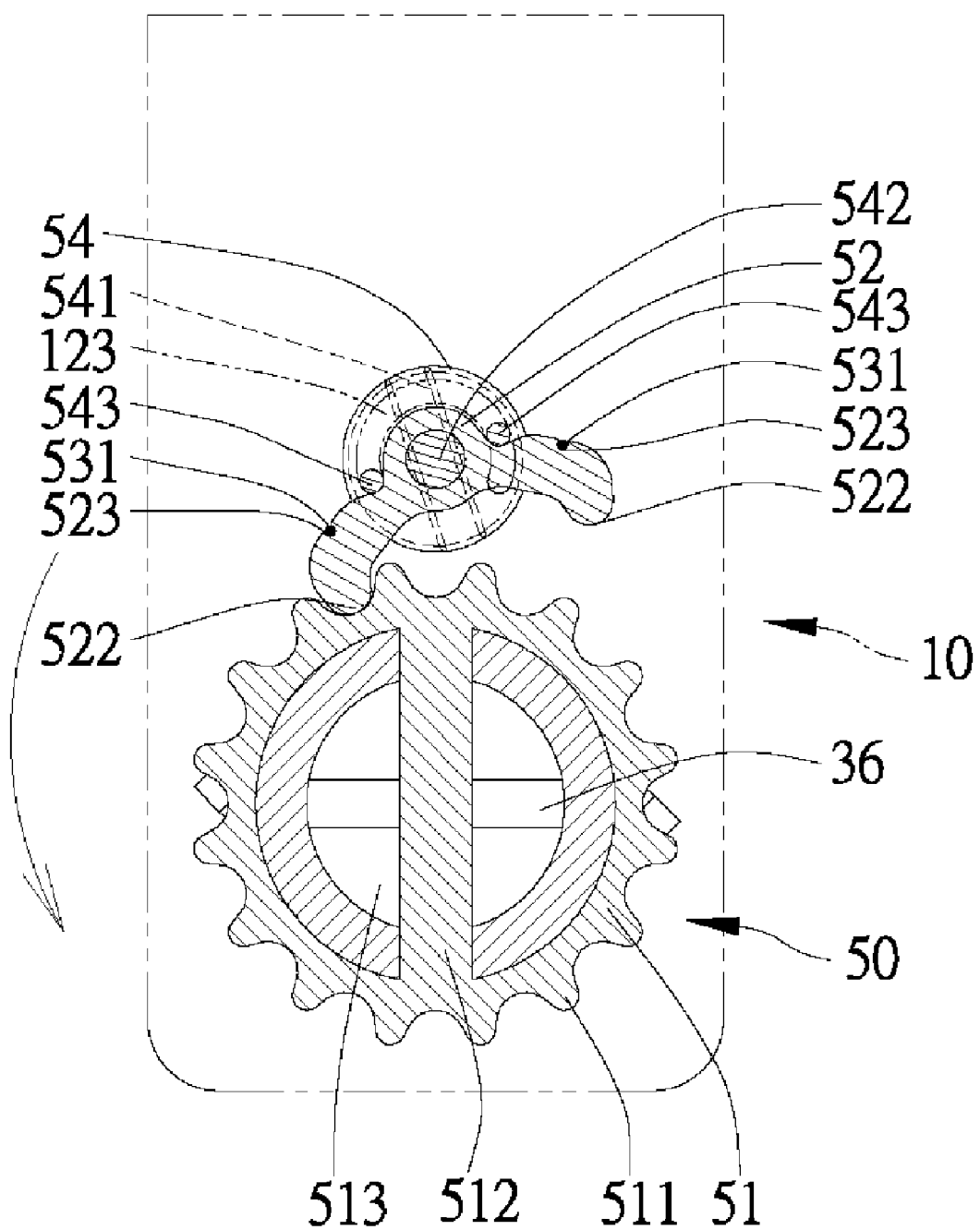
FIG. 4 is a cross-sectional view of the fastener taken along a line 4-4 shown in FIG. 1.
Figure 5:
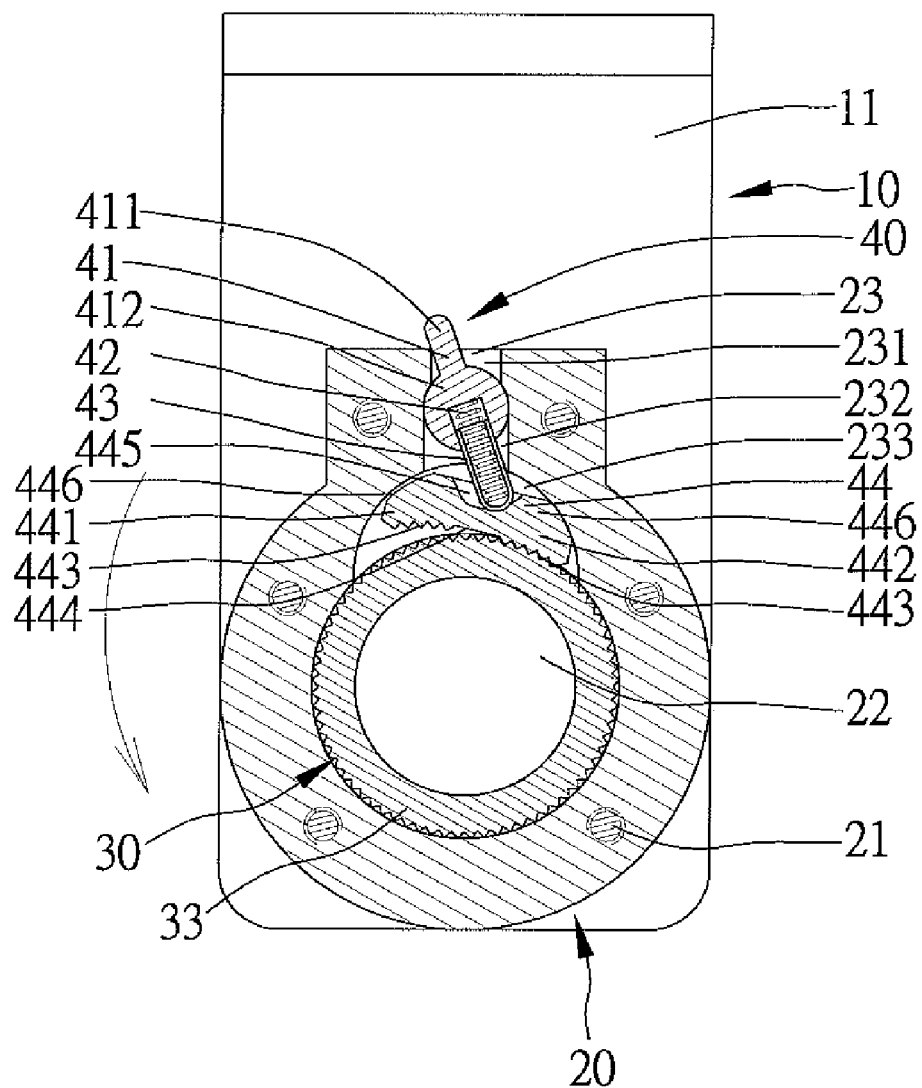
FIG. 5 is a cross-sectional view of the fastener taken along a line 5-5 shown in FIG. 1.

Referring to FIGS. 1 through 5, the fastener includes a frame 10, a collar 20, a reel 30, a first switching device 40 and a second switching device 50.

The frame 10 includes a first wall 11, a second wall 12 and a roof 13 formed between the walls 11 and 12. The first wall 11 defines an opening 111 and a plurality of screw holes 112 around the opening 111. The second wall 12 defines an opening 121, an aperture 122, an annular groove 124 in the wall of the aperture 122 and an arched slot 123 around the aperture 122.

The collar 20 defines an opening 22 and a radial aperture 23 in communication with the opening 22. The radial aperture 23 includes a first portion 231, a second portion 232 larger than the first portion 231 and a third portion 233 larger than the second portion 232.

A plurality of threaded bolts 21 is driven into the screw holes 112 through a plurality of apertures defined in the collar 20. Therefore, the collar 20 is attached to the first wall 11.

The reel 30 includes a first end 31, a second end 35, a reeling portion 34 between the ends 31 and 35, an annular ridge 32 near the first end 31 and a series of teeth 33 near the annular ridge 32. A plurality of radial apertures 311 is defined in the first end 31 of the reel 30. A slit 341 is defined in the reeling portion 34 and the second end 35 of the reel 30. An aperture 351 is defined in the second end 35 of the reel 30.

The second end 35 of the reel 30 is inserted through the openings 22, 111 and 121. The reeling portion 34 of the reel 30 is located between the walls 11 and 12. The teeth 33 are located in the collar 20.

The first switching device 40 includes a switch 41, an elastic element 42, a sheath 43 and a detent 44. The switch 41 includes an axle 412, a lever 411 extended from the top of the axle 412 and a recess 413 defined in the bottom of the axle 412.

The lever 411 is exposed from the first portion 231 of the radial aperture 23, while the axle 412 is located in the second portion 232. The switch 41 can be pivoted on the collar 20.

An end of the elastic element 42 is inserted in the recess 413, while the other end of the elastic element 42 is inserted in the sheath 43.

The detent 44 is formed with a first end 441 and a second end 442. The detent 44 includes, on the bottom, a first group of teeth 443 near the first end 441 and a second group of teeth 443 near the second end 442. The first group is separated from the second groove by a smooth face 444. A recess 445 is defined in the top of the detent 44. The detent 44 includes, between the bottom and top, a first contact face 446 near the first end 441 and a second contact face 446 near the second end 442.

The detent 44 is located in the third portion 233 of the aperture 23 so that the sheath 43 is inserted in the recess 445. Thus, the detent 44 will be moved when the switch 41 is pivoted.

The second switching device 50 includes a toothed wheel 51, a detent 52, an elastic element 53 and a switch 54. The toothed wheel 51 includes a plurality of teeth 511. The toothed wheel 51 defines two openings 513 separated from each other by a rib 512.

The toothed wheel 51 is mounted on the reel 30, with the rib 512 disposed in the slit 341. The toothed wheel 51 is kept on the reel 30 by a pin 36 fit in the aperture 351.

The detent 52 includes first and second ends 522. The detent 52 defines first and second recesses 523 near the first and second ends 522, respectively, and an aperture 521 between the first and second ends 522.

The elastic element 53 is a torque spring with a helical body 532, a first leg 533 extended from the helical body 532, a first foot 531 transversely extended from the first leg 533, a second leg 533 extended from the helical body 532 and a second foot 531 transversely extended from the second leg 533.

The feet 531 are disposed in the recesses 523. The helical body 532 is aligned with the aperture 521.

The switch 54 includes a tab 541 on a side, an axle 542 on another side and two rods 543 near the axle 542. The axle 542 is formed with a neck 544 of a reduced size.

The axle 542 is inserted in the helical body 532, the aperture 521 and the aperture 122. The neck 544 is clipped by a C-clip 55 disposed in the annular groove 124 so that the switch 54, the elastic element 53 and the detent 52 are kept on the reel 30. The rods 543 are inserted in the arched slot 123 for smooth rotation of the switch 54 on the second wall 12.

Figure 6:
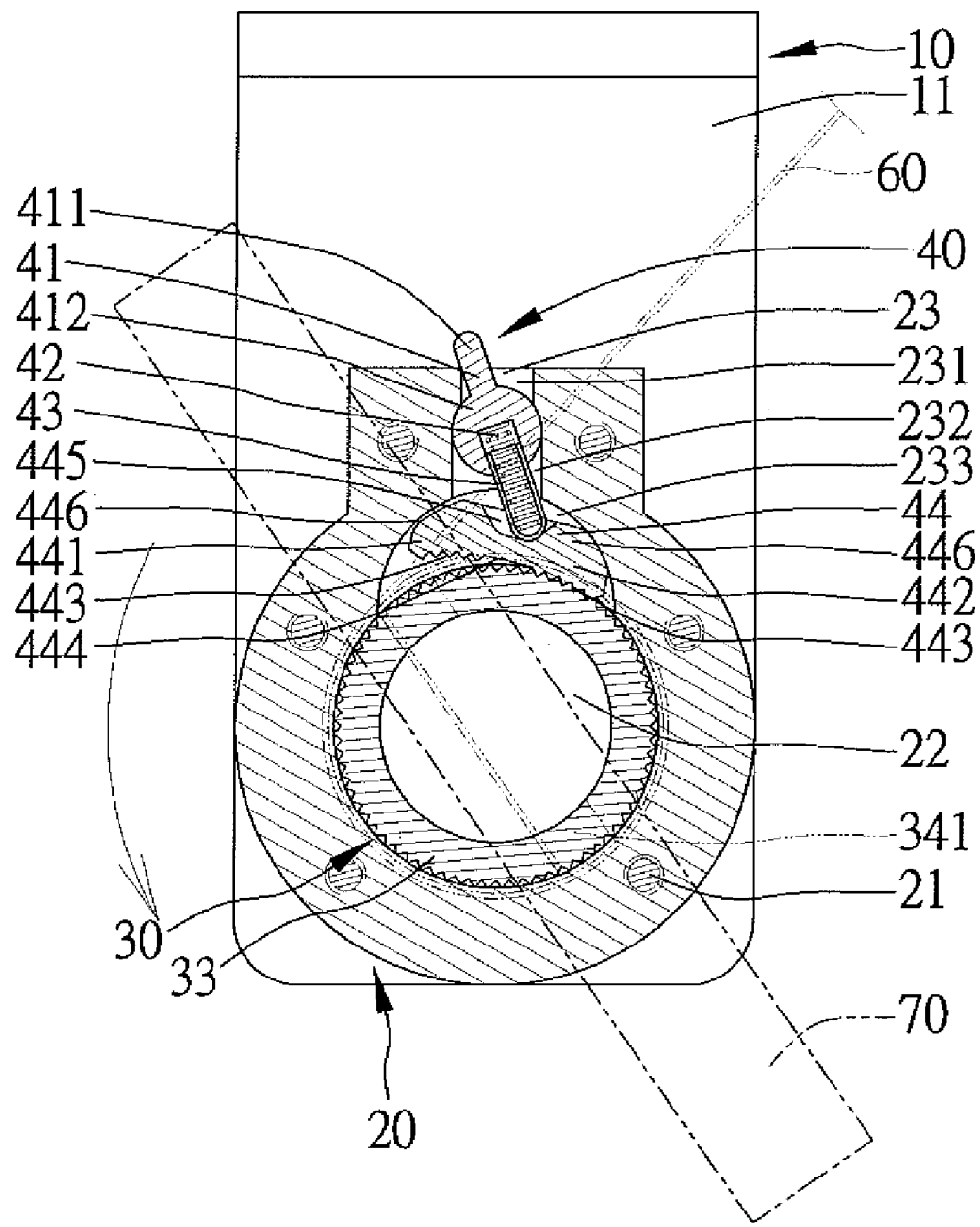
FIGS. 6 and 7 are cross-sectional views of a strap reeled into the fastener shown in FIG. 5.
Figure 7:
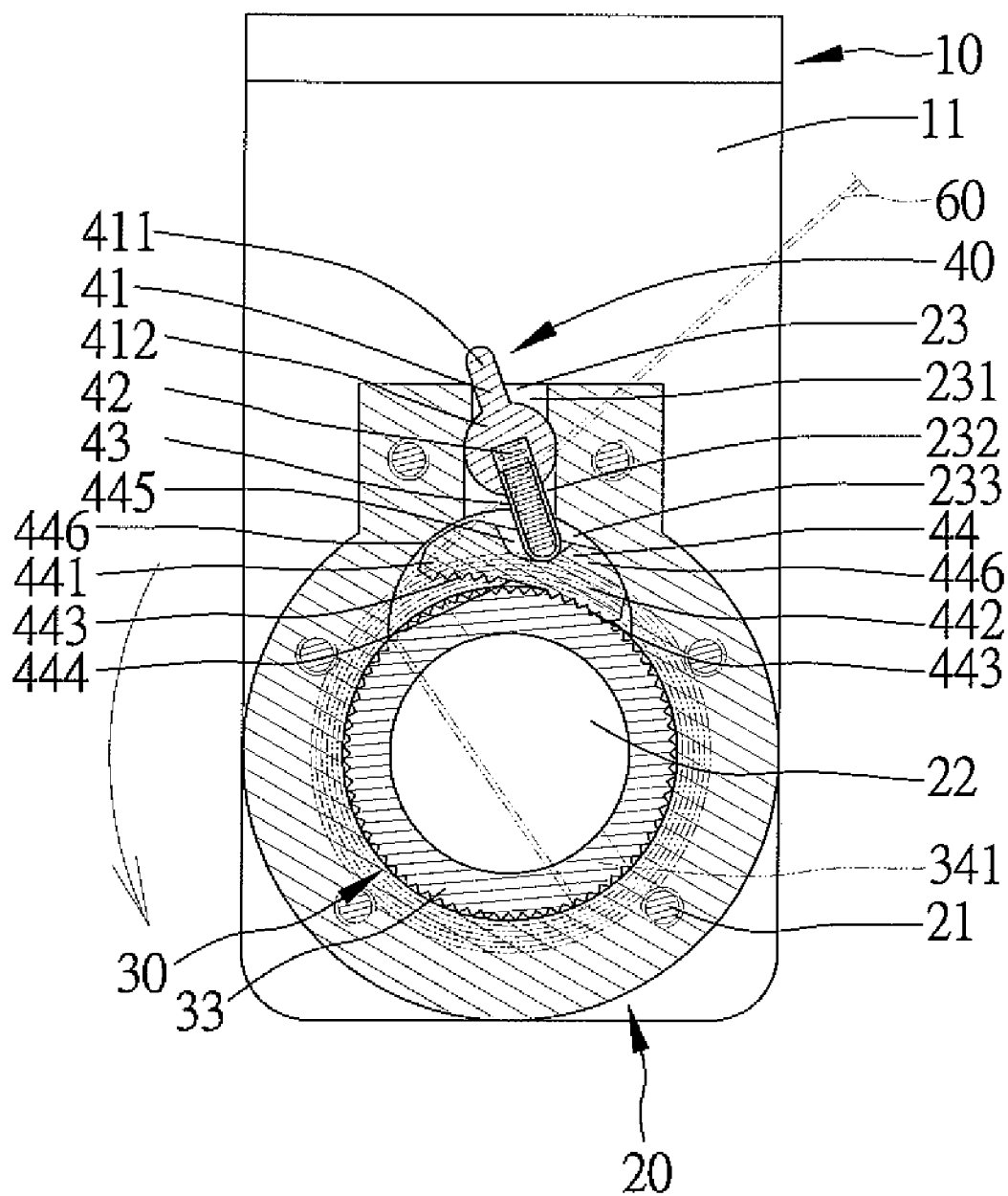

Referring to FIGS. 4 through 7, the fastener is in position for reeling in the strap 60. The first end 522 of the detent 52 is engaged with the teeth 511 of the toothed wheel 51. The second group of teeth 443 of the detent 44 is engaged with the teeth 33 of the reel 30. Thus, counterclockwise rotation of the reel 30 is allowed, but not vice versa. An end of the strap 60 is inserted through the slit 341. A handle 70 is inserted in one of the radial apertures 311. The strap 60 will be wound onto the reel 30, i.e., reeled in when the handle 70 is rotated.

Figure 8:
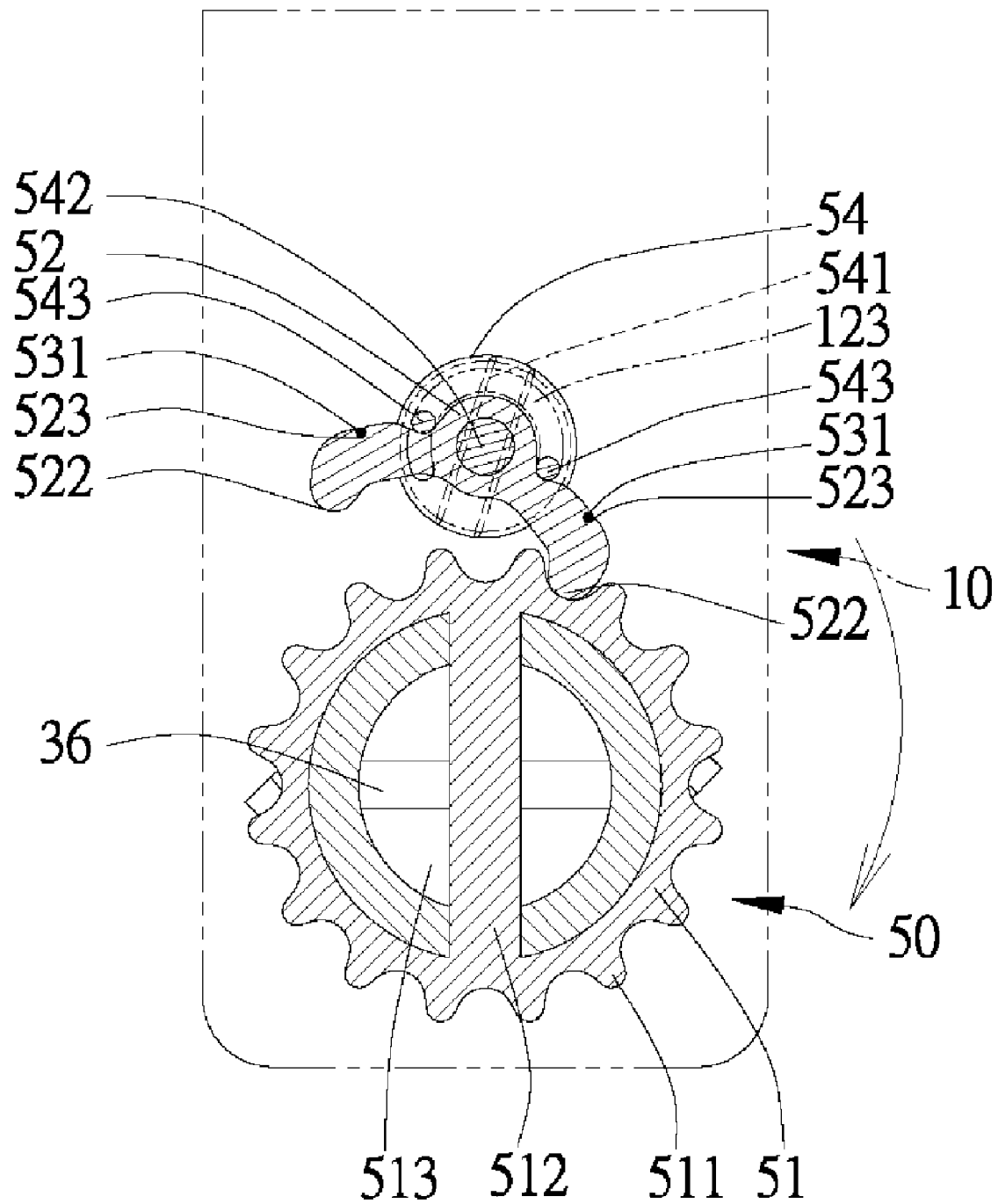
FIG. 8 is a cross-sectional view of the fastener in another position than shown in FIG. 4.
Figure 9:
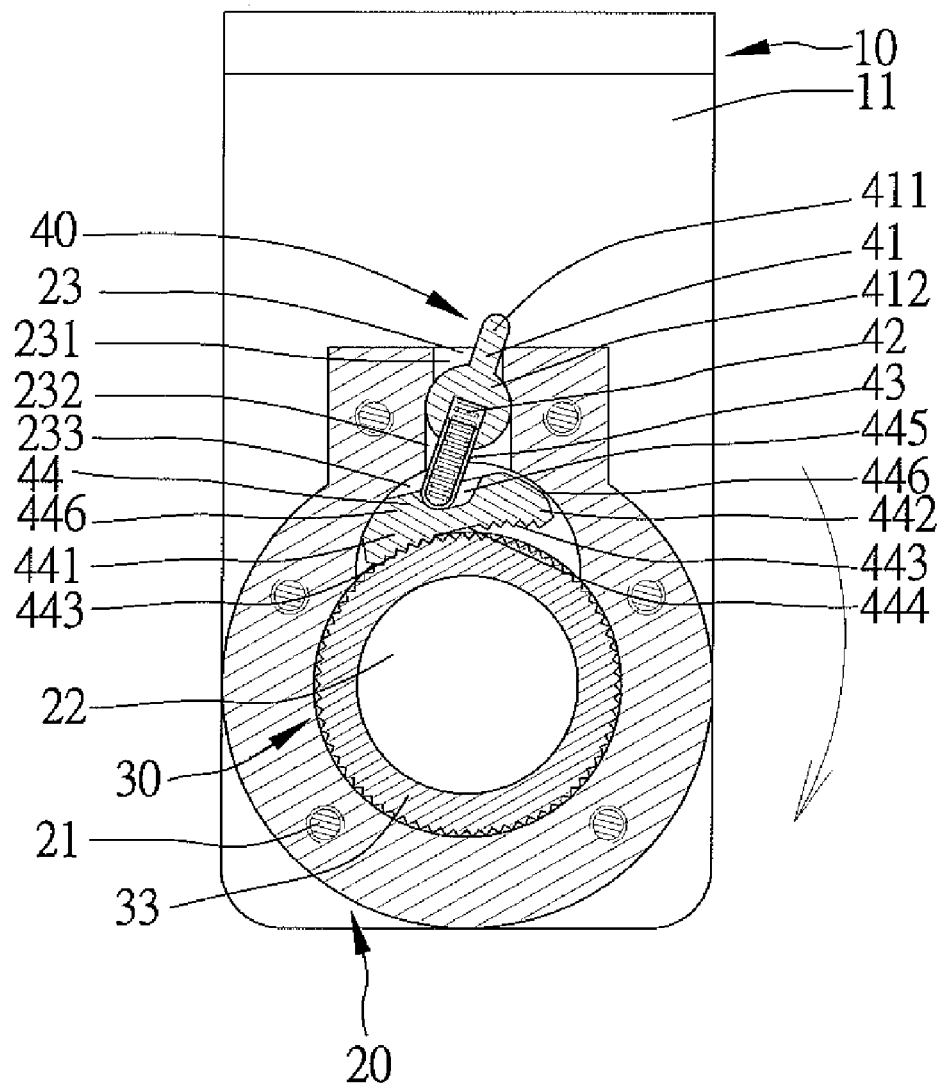
FIG. 9 is a cross-sectional view of the fastener in another position than shown in FIG. 5.
Figure 10:
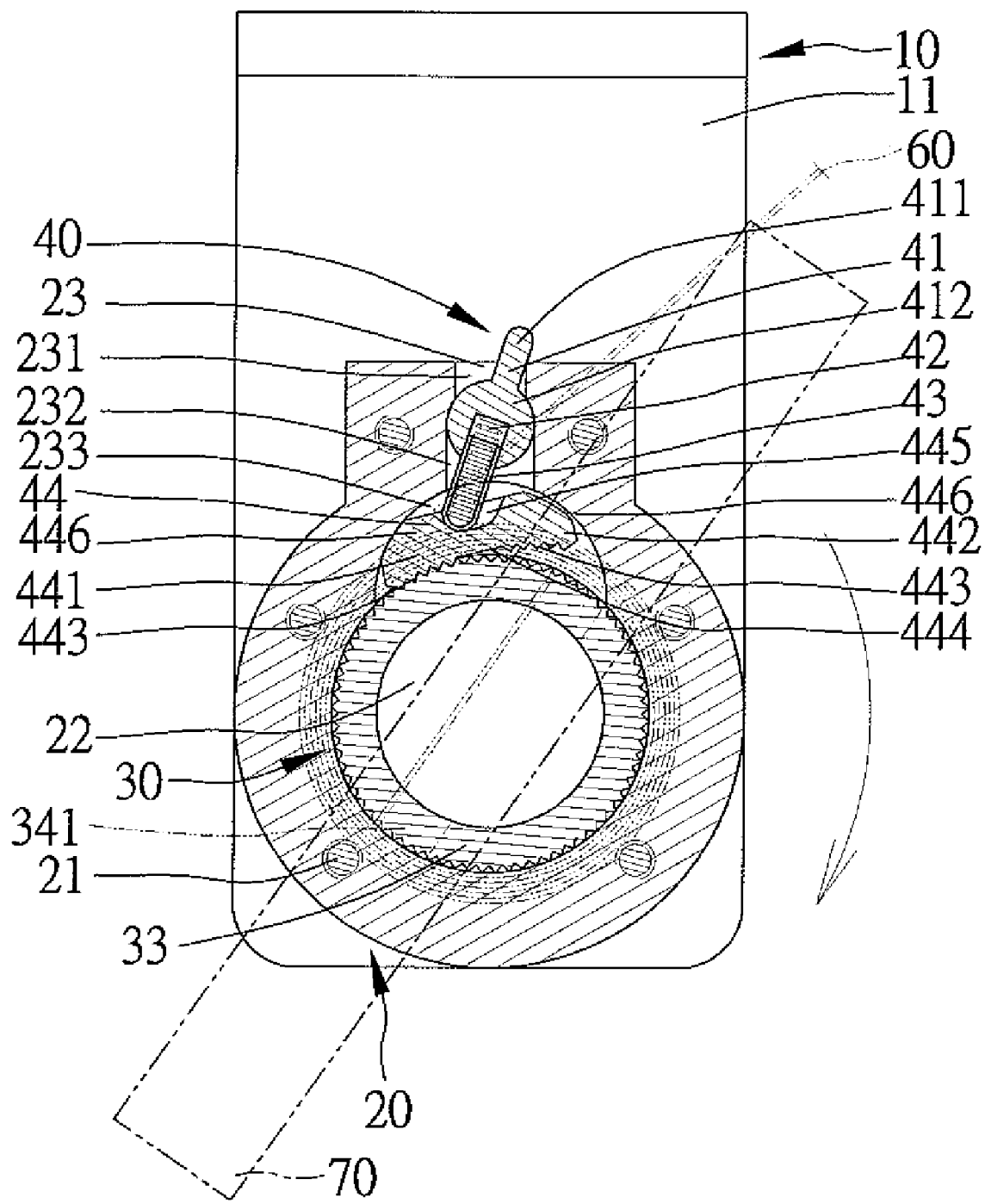
FIGS. 10 and 11 are cross-sectional views of the strap reeled out from the fastener shown in FIG. 9.
Figure 11:
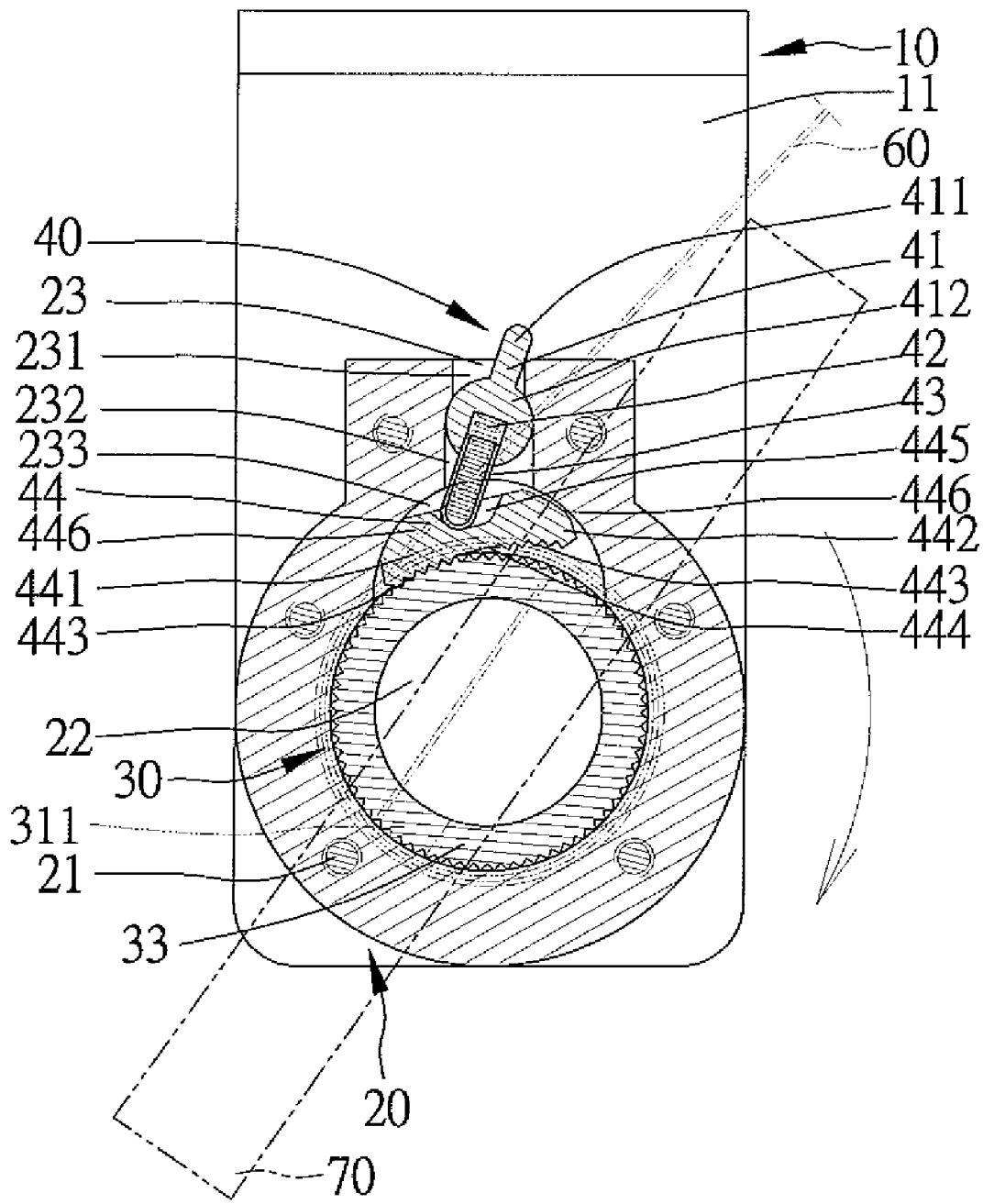

Referring to FIGS. 8 through 11, the fastener is in a position for slowly reeling out the strap 60. The second end 522 of the detent 52 is engaged with the teeth 511 of the toothed wheel 51. The first group of teeth 443 of the detent 44 is engaged with the teeth 33 of the reel 30. Thus, clockwise rotation of the reel 30 is allowed, but not vice versa. That is, the strap 60 can be reeled out. However, the reeling out of the strap 60 is slow due to the detent 52 engaged with the toothed wheel 51 and the detent 44 with the reel 30.

The fastener according to the present invention exhibits several advantages. Firstly, the switch between the reel-in and reel-out modes is convenient. Secondly, the operation is safe, since the reeling out of the strap is slow.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A fastener comprising:
a frame including a first wall and a second wall spaced from the first wall;
a collar connected to the first wall of the frame with the first wall intermediate the collar and the second wall;
a reel inserted through and rotatable relative to the collar and the first and second walls of the frame so that a strap located between the first and second walls of the frame can be reeled in and reeled out when the reel is rotated in a direction and an opposite direction;
a first switching device provided between the reel and the collar so that the first switching device is operable to switch the reel between a reel-out mode and a reel-in mode; and
a second switching device provided between the reel and the frame so that the second switching device is operable to switch the reel between a reel-in mode and a reel-out mode, with the second wall intermediate the second switching device and the first wall.

2. A fastener comprising:
a frame;
a collar connected to the frame;
a reel inserted through the collar and the frame so that a strap can be reeled in and reeled out when the reel is rotated in a direction and an opposite direction;
a first switching device provided between the reel and the collar so that the first switching device is operable to switch the reel between a reel-out mode and a reel-in mode; and
a second switching device provided between the reel and the frame so that the second switching device is operable to switch the reel between a reel-in mode and a reel-out mode, wherein the reel comprises a series of teeth, and the first switching device comprises a detent movable between the reel and the collar and formed with a first group of teeth engaged with the teeth of the reel in the reel-out mode and a second group of teeth engaged with the teeth of the reel in the reel-in mode.

3. The fastener according to claim 2 wherein the first switching device comprises a switch connected to the detent on one hand and exposed from the collar on the other hand so that the switch is operable to move the detent.

4. The fastener according to claim 3 wherein the collar defines an opening and an aperture in communication with the opening, and the reel is inserted through the opening, and the switch and the detent are disposed in the aperture.

5. The fastener according to claim 4 wherein the switch comprises an axle and a lever extended from the axle, and the axle is disposed in the aperture while the lever is exposed from the aperture.

6. The fastener according to claim 5 wherein the aperture comprises a first portion from which the lever is exposed and a second portion in which the axle is disposed.

7. The fastener according to claim 3 wherein the first switching device comprises an elastic element for elastically connecting the switch to the detent.

8. The fastener according to claim 7 wherein the switch defines a recess for receiving an end of the elastic element.

9. The fastener according to claim 8 wherein the detent defines a recess for receiving the elastic element.

10. The fastener according to claim 8 wherein the first switching device comprises a sheath for receiving another end of the elastic element.

11. The fastener according to claim 10 wherein the detent defines a recess for receiving the sheath.

12. The fastener according to claim 2 wherein the detent comprises smooth face for separating the first group of teeth from the second group of teeth.

13. A fastener comprising:
a frame;

a collar connected to the frame;

a reel inserted through the collar and the frame so that a strap can be reeled in and reeled out when the reel is rotated in a direction and an opposite direction;

a first switching device provided between the reel and the collar so that the first switching device is operable to switch the reel between a reel-out mode and a reel-in mode; and a second switching device provided between the reel and the frame so that the second switching device is operable to switch the reel between a reel-in mode and a reel-out mode, wherein the second switching device comprises:

a toothed wheel connected to the reel and formed with a series of teeth; and a detent provided between the reel and the collar and formed with a first end engaged with the teeth of the toothed wheel in the reel-in mode and a second end engaged with the teeth of the toothed wheel in the reel-out mode.

14. The fastener according to claim 13 wherein the second switching device comprises a switch connected to the detent so that the switch is operable to switch the detent between the reel-in and reel-out modes.

15. The fastener according to claim 14 wherein the switch comprises an axle on a side and a tab on an opposite side, and the axle is pivotally connected to the frame so that the tab is operable to turn the axle.

16. The fastener according to claim 15 wherein the second switching device comprises an elastic element for elastically connecting the switch to the detent.

17. The fastener according to claim 16 wherein the elastic element is a torque spring.

18. The fastener according to claim 17 wherein the torque spring comprises a helical body, a first leg extended from the helical body and a second leg extended from the helical body, and the first leg of the helical spring is connected to the first end of the detent while the second leg of the helical spring is connected to the second end of the detent.

19. The fastener according to claim 18 wherein the helical spring comprises a first foot transversely extended from the first leg and connected to the first end of the detent and a second foot transversely extended from the second leg and connected to the second end of the detent.

20. The fastener according to claim 18 wherein the switch comprises a first rod in contact with the first leg of the torque spring and a second rod in contact with the second leg of the torque spring.

\* \* \* \* \*